(12) United States Patent
Bjorkman et al.

(10) Patent No.: US 10,001,164 B2
(45) Date of Patent: Jun. 19, 2018

(54) DOUBLE-ROW SPHERICAL ROLLER BEARING

(71) Applicants: Emma Bjorkman, Trollhättan (SE); Peter James, Mölndal (SE); Marcus Loof, Nol (SE); Lars Stigsjöö, Angered (SE)

(72) Inventors: Emma Bjorkman, Trollhättan (SE); Peter James, Mölndal (SE); Marcus Loof, Nol (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 265 days.

(21) Appl. No.: 14/988,899

(22) Filed: Jan. 6, 2016

(65) Prior Publication Data
US 2016/0201720 A1 Jul. 14, 2016

(30) Foreign Application Priority Data

Jan. 8, 2015 (SE) ...................... 1550008

(51) Int. Cl.
*F16C 23/08* (2006.01)
*F03D 1/06* (2006.01)
(Continued)

(52) U.S. Cl.
CPC .......... *F16C 23/084* (2013.01); *F03D 1/0666* (2013.01); *F03D 80/70* (2016.05);
(Continued)

(58) Field of Classification Search
CPC ...... F16C 23/08; F16C 23/082; F16C 23/084; F16C 23/086; F16C 33/586
See application file for complete search history.

(56) References Cited

U.S. PATENT DOCUMENTS

| 1,967,650 | A | * | 7/1934 | Ahmansson | .......... F16C 23/086 |
| | | | | | 384/571 |
| 3,751,124 | A | * | 8/1973 | Hanson | ................ B63H 23/321 |
| | | | | | 384/558 |

(Continued)

FOREIGN PATENT DOCUMENTS

| CN | 102305239 A | 1/2012 |
| JP | H1130232 A | 2/1999 |
| WO | 2014062108 A1 | 4/2014 |

OTHER PUBLICATIONS

SKF Rolling Bearing Catalogue (PUB BU/P1 10000/2 EN, Aug. 2013) on p. 63 and 85.

*Primary Examiner* — Thomas R Hannon
(74) *Attorney, Agent, or Firm* — Bryan Peckjian; SKF USA Inc. Patent Dept.

(57) ABSTRACT

A double-row spherical roller bearing, comprising an outer ring including at least one spherical inner raceway on a radially inner peripheral surface, an inner ring including a first and second axial end and at least one outer raceway on a radially outer peripheral surface. Spherical roller elements are located in first and second roller rows interposed in-between the inner and outer raceways. A first flange is located at the first axial end, extending in a circumferential direction of the outer peripheral surface. The inner ring is subjected to an axial load in a first axial direction wherein the first flange approaches the first roller row. An axial extension of the first flange extends without contacting any first roller row roller elements during bearing operation, when an axial load is acting on the inner ring in the first axial direction. The bearing can be integrated into a wind turbine.

15 Claims, 3 Drawing Sheets

(51) Int. Cl.
*F16C 19/38* (2006.01)
*F16C 33/58* (2006.01)
*F03D 80/70* (2016.01)

(52) U.S. Cl.
CPC ............ F16C 19/38 (2013.01); F16C 33/586 (2013.01); *F16C 2360/31* (2013.01); *Y02E 10/721* (2013.01); *Y02E 10/722* (2013.01)

(56) References Cited

U.S. PATENT DOCUMENTS

| | | | | |
|---|---|---|---|---|
| 3,910,656 A * | 10/1975 | Price | ................... | F16C 23/086 384/558 |
| 4,475,777 A * | 10/1984 | Hofmann | .............. | F16C 23/086 384/572 |
| 8,007,184 B2 * | 8/2011 | Murai | ................... | F16C 19/38 384/450 |
| 2016/0169282 A1 * | 6/2016 | Manne | ................. | F16C 33/585 384/477 |

* cited by examiner

DOUBLE-ROW SPHERICAL ROLLER BEARING

CROSS REFERENCE TO RELATED APPLICATION

This is a Non-Provisional Patent Application, filed under the Paris Convention, claiming the benefit of Sweden (SE) Patent Application Number 1550008-5, filed on 8 Jan. 2015, which is incorporated herein by reference in its entirety.

TECHNICAL FIELD

According to a first aspect, the disclosure regards a double-row spherical roller bearing.

According to a second aspect, the disclosure regards a wind turbine bearing arrangement.

BACKGROUND

Rolling bearings are common mechanical elements that are used in many different applications. There are different kinds of rolling bearings, which are designed to fulfill different requirements. Depending on the conditions of a specific application, i.e. load level, rotation speed, temperature etc., there are different kinds of suitable rolling bearings. One common bearing type is spherical roller bearing (SRB). This bearing is designed to accommodate large radial loads and axial loads, but also it is designed to be able to accommodate shaft deflections, i.e. the bearing rings are able to be relatively misaligned. Thus, this bearing is especially suitable for more demanding industrial applications, such as machines in pulp & paper industry, wind turbines etc.

The spherical roller bearings present different designs. There are for instance bearings with and without flanges on the inner ring. The flanges can function as a guiding flange for the roller elements and also they can function as a retaining flange used to prevent rollers from falling out from the bearing during e.g. operation and transportation. An example of a prior art spherical roller bearing comprising inner ring flanges can be seen in FIG. 5, which will be further described below.

SUMMARY

In view of the above, an object of the disclosure is to provide an improved spherical roller bearing design. Especially, an object of the disclosure is to provide an improved bearing design which is adapted, customized and suitable for slow rotating applications and/or for applications where the bearing is subjected to large axial loads. This has been achieved by the subject matter as defined in the independent claims. Preferred and exemplary embodiments can be found in the dependent claims and in the accompanying description.

According to the first aspect of the disclosure, the object has been achieved by a double-row spherical roller bearing, which comprises an outer ring presenting at least one spherical inner raceway on a radially inner peripheral surface, an inner ring presenting a first and second axial end and at least one outer raceway on a radially outer peripheral surface and spherical roller elements located in a first and second roller row interposed in-between the at least one inner raceway and the at least one outer raceway. Moreover, the bearing comprises a first flange located at the first axial end and extending in the circumferential direction of the outer peripheral surface, wherein there is a first axial gap located in-between the first flange and the adjacent first roller row, and wherein the inner ring may be subjected to an axial load in a first axial direction such that the first flange approaches the first roller row. During operation of the bearing the first axial gap will not decrease to zero when the axial load is acting on the inner ring in the first axial direction.

It has been realized by the inventors that in situations when there are large axial loads and also in slow-rotating applications, the proposed design according to the present disclosure is advantageous. During large axial loads, the roller row which does not accommodate the axial load in the bearing may be squeezed towards its respective inner ring flange. If the bearing is equipped with a guide ring (i.e. a ring for guiding the roller elements and which is located axially in-between the two roller rows) the squeezing may be between the side flange, roller and the guide ring. Squeezing of rollers may lead to reduced performance of the bearing. Especially it may lead to reduced service life of the bearing since the rollers may be subjected to unnecessary wear. When the bearing is slowly rotating, and if the unloaded zone of the bearing is located above the loaded zone, the rollers may fall out in the direction towards its respective inner ring flange. With the new proposed design unwanted noise due to contacts between rollers and flange can be avoided. The unloaded zone of the bearing is the zone, seen in circumferential direction of the bearing, wherein the roller elements are not affected by the radial load which the bearing is subjected to. The loaded and unloaded zone of a bearing is something which is well recognized by the skilled person. With the new proposed design, the side flange in the roller bearing will not come in contact with the rollers during operation. Between the two inner ring side flanges, there is, axially, space for two sets of rollers and a cage, plus a potential guide ring. At high axial loads, one roller set is loaded between the raceways of the inner and outer ring. The other components (second roller set, cage and the potential guide ring) are axially free. With the present design proposal there will always, even at excessive axial loads, be room for these other components between the loaded roller set and the opposite inner ring side flange. However, in an embodiment, the flange may act as a retaining flange. A retaining flange will restrict the roller elements from falling out from the bearing during assembly of the bearing and during other handling of the bearing, e.g. during transportation and mounting of the bearing. Especially, if the inner ring is extensively sphered out from the outer ring, which is common when mounting the roller elements in-between the outer and inner ring, the flange will restrict the roller elements from falling out from the bearing.

In this document, axial and radial directions are mentioned and used to explain many of the features of this disclosure. Unless expressed otherwise for any of the embodiments herein, axial direction is the direction following the rotational axis of the roller bearing, and wherein radial direction is the direction which is perpendicular to the rotational axis of the roller bearing.

In an embodiment of the present disclosure, the double-row spherical roller bearing further comprises a second flange located at the second axial end and extending in the circumferential direction of the outer peripheral surface, and wherein there is a second axial gap located in-between the second flange and the adjacent second roller row. As for the first flange, the second flange may act as a retaining flange. In a further embodiment, when the bearing comprises a second flange, the inner ring may be subjected to an axial load in a second axial direction such that the second flange approaches the second roller row, and wherein the second axial gap will not decrease to zero when the axial load is acting on the inner ring in the second axial direction during operation of the bearing. Thus, if there is a second flange and when the bearing is subjected to an axial load in the second axial direction, the second flange will not contact any of the roller elements in the second roller row. The same effects and advantages as the ones described above with regards to the first flange have also been recognized for the second flange.

In an embodiment of the present disclosure, the double-row spherical roller bearing presents a guide ring located axially in-between the first and second roller rows.

In an embodiment of the present disclosure, the axial load acting on the inner ring in the first axial direction corresponds to an equivalent load in the range of 4≥C/P≥1, wherein C is a basic dynamic load rating in Newtons and P is an equivalent dynamic bearing load in Newtons. C and P is something well recognized by the skilled person and a definition of C and P can for instance be found in the SKF Rolling Bearing Catalogue (PUB BU/P1 10000/2 EN, August 2013) on page 63 and 85. In a further embodiment, the axial load acting on the inner ring in the first axial direction corresponds to an equivalent load in any of the ranges in the following table:

| 4 | ≥ C/P ≥ | 1 |
|---|---|---|
| 3.9 | | 1.1 |
| 3.8 | | 1.2 |
| 3.7 | | 1.3 |
| 3.6 | | 1.4 |
| 3.5 | | 1.5 |
| 3.4 | | 1.6 |
| 3.3 | | 1.7 |
| 3.2 | | 1.8 |
| 3.1 | | 1.9 |
| 3 | | 2 |
| 2.9 | | |
| 2.8 | | |
| 2.7 | | |
| 2.6 | | |
| 2.5 | | |
| 2.4 | | |
| 2.3 | | |
| 2.2 | | |
| 2.1 | | |

It shall be noted that any combination of any of the values in the left hand row can be combined with any of the values in the right hand row.

In an embodiment of the present disclosure, the axial load acting on the inner ring in the second axial direction corresponds to an equivalent load in the range of 4≥C/P≥1, wherein C is a basic dynamic load rating in Newtons and P is an equivalent dynamic bearing load in Newtons. C and P is something well recognized by the skilled person and a definition of C and P can for instance be found in the SKF Rolling Bearing Catalogue (PUB BU/P1 10000/2 EN, August 2013) on page 63 and 85. In a further embodiment, the axial load acting on the inner ring in the second axial direction corresponds to an equivalent load in any of the ranges in the following table:

| 4 | ≥ C/P ≥ | 1 |
|---|---|---|
| 3.9 | | 1.1 |
| 3.8 | | 1.2 |
| 3.7 | | 1.3 |
| 3.6 | | 1.4 |
| 3.5 | | 1.5 |
| 3.4 | | 1.6 |
| 3.3 | | 1.7 |
| 3.2 | | 1.8 |
| 3.1 | | 1.9 |
| 3 | | 2 |
| 2.9 | | |
| 2.8 | | |
| 2.7 | | |
| 2.6 | | |
| 2.5 | | |
| 2.4 | | |
| 2.3 | | |
| 2.2 | | |
| 2.1 | | |

It shall be noted that any combination of any of the values in the left hand row can be combined with any of the values in the right hand row.

In an embodiment of the present disclosure, the inner ring further presents a first circumferential intermediate surface located on the outer peripheral surface and axially in-between the first flange and the at least one outer raceway. In a further embodiment, when the roller bearing presents a second flange, the inner ring further presents a second circumferential intermediate surface located on the outer peripheral surface and axially in-between the second flange and the at least one outer raceway. In yet a further embodiment, an axial extension of any of the first intermediate surface or second intermediate surface is extending such that a turning tool for turning the at least one outer raceway will not come in contact with the first respective flange or second respective flange during a turning operation. It has further been realized by the inventors that by having an intermediate surface between the first flange and/or second flange and the outer raceway surface of the inner ring, manufacturing will be significantly simplified. In yet a further embodiment, any of the first intermediate surface or second intermediate surface is further extended such that there is an axial gap between the turning tool and the first respective flange or second respective flange when the turning tool has reached a respective first axial end or second axial end of the outer raceway during the turning operation. It may be advantageous to have a certain safety margin between the respective flanges and the turning tool during the manufacturing operation. In a further embodiment, the respective axial gap between the turning tool and any of the first flange or second flange during the turning operation is in the range of 1-3 mm, and more preferably 2 mm. In an embodiment, the turning tool may have a radius of about 4-8 mm.

In an embodiment of the present disclosure, any of the first flange or second flange presents an inner axial end face surface extending radially and in the circumferential direction, wherein the inner axial end face surface is angled out from the at least one outer raceway in the range of 0-3 degrees in relation to the radial direction of the bearing. This design may further facilitate the manufacturing of the inner ring and may lead to that the manufacturing process is simplified and thus manufacturing cost will be reduced. This angle of the side face plane would be more optimized for the turning tool, especially if the tool is a hard turning tool.

In an embodiment of the present disclosure, any of the first flanges or second flanges are integrated with the inner ring.

According to the second aspect, the object is achieved by a wind turbine bearing arrangement, which comprises a rotor shaft connected to a plurality of rotor blades, wherein the rotor shaft is rotatably supported by at least one rolling bearing, and wherein the at least one rolling bearing is a double-row spherical roller bearing according to any of the embodiments of the first aspect of the disclosure. It shall be noted that any embodiment of the first aspect of the disclosure is applicable to any embodiment of the second aspect of the disclosure and vice versa. As earlier mentioned, the bearing according to the first aspect of the disclosure is especially suitable in applications which are designed to accommodate large axial loads and also in slow-rotating applications. In an embodiment of the wind turbine, the rotor shaft will rotate with a rotational speed of less than 50 revolutions per minute (rpm). By having a wind turbine comprising a spherical roller bearing according to the first aspect of the disclosure, the service life of the bearing arrangement may be increased, due to reduced roller wear. Also, as earlier mentioned, unwanted "clicking" noise may be reduced.

BRIEF DESCRIPTION OF DRAWINGS

Exemplifying embodiments of the present disclosure will now be described in more detail, with reference to the accompanying drawings, wherein.

Figure 1:
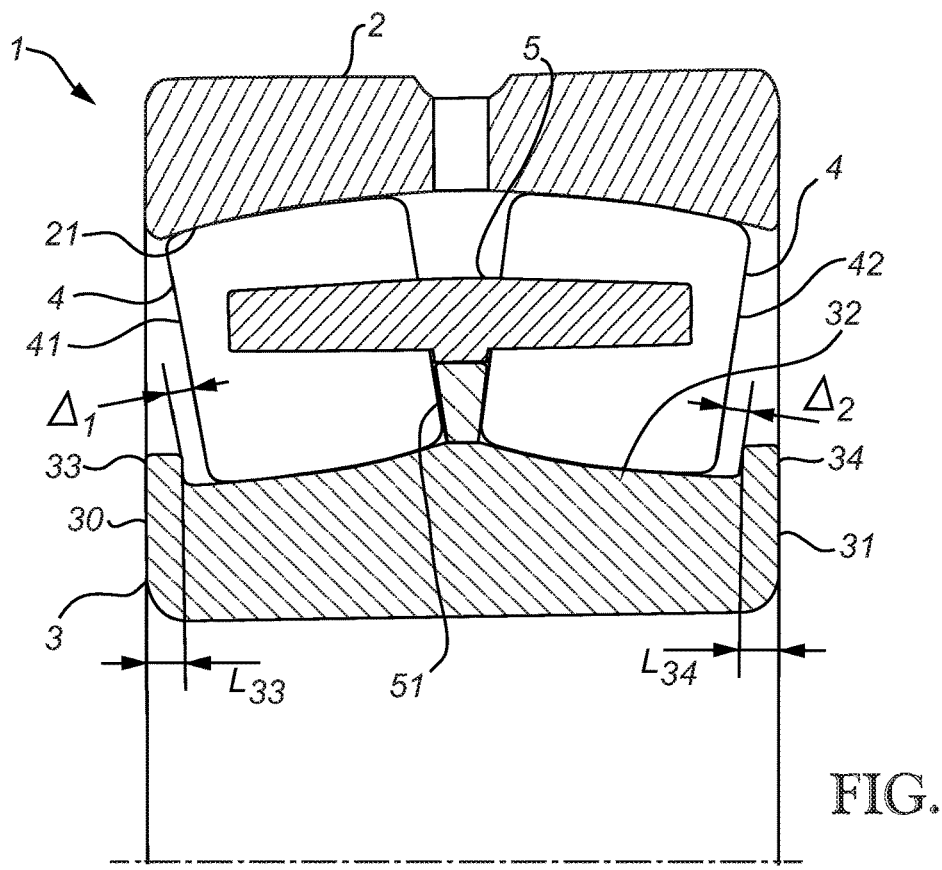
FIG. 1 illustrates a cross section of an embodiment of a double-row spherical roller bearing according to the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION OF DRAWINGS

In FIG. 1 a double-row spherical roller bearing 1 according to an embodiment of the disclosure can be seen. The bearing 1 comprises the following: an outer ring 2 presenting at least one spherical inner raceway 21 on a radially inner peripheral surface. An inner ring 3 presents a first and second axial end 30, 31 and at least one outer raceway 32 on a radially outer peripheral surface. Spherical roller elements 4 are located in a first 41 and second 42 roller row interposed in-between the at least one inner raceway 21 and the at least one outer raceway 32. Moreover, the bearing 1 comprises a first flange 33 located at the first axial end 30 and extending in the circumferential direction of the outer peripheral surface, wherein there is a first axial gap $\Delta_1$ located in-between the first flange 33 and the adjacent first roller row 41, and wherein the inner ring 3 may be subjected to an axial load in a first axial direction such that the first flange 33 approaches the first roller row 41. The axial gap $\Delta_1$ between the first flange 33 and the roller 4 in the first roller row 41 will not decrease to zero when there is an axial load acting on the bearing 1 in the first axial direction during operation of the bearing 1. An axial extension $L_{33}$ of the first flange 33 is extending such that there will be no contact with any roller elements 4 of the first roller row 41 during operation of the bearing 1 when there is an axial load acting on the inner ring 3 in the first axial direction. Thus, when an axial load is acting on the inner ring 3 such that the first flange 33 will approach the roller row 41, the flange 33 shall not come in contact with any roller 4 in the first roller row 41. In known SRB designs with inner ring flanges, there is almost no gap between the flanges and its corresponding roller rows. The advantage of designing the bearing as in the present disclosure, with a larger axial gap, is that the contact between flange and rollers when a large axial load is applied to the inner ring is avoided, and this may lead to reduced noise and also it may lead to an increased bearing performance. In addition, bearing service life may be increased with this design. Further in this embodiment, the bearing 1 comprises a second flange 34 located at the second axial end 31 and extending in the circumferential direction of the outer peripheral surface, wherein there is a second axial gap $\Delta_2$ located in-between the second flange 34 and the adjacent second roller row 42, and wherein the inner ring 3 may be subjected to an axial load in a second axial direction such that the second flange 34 approaches the second roller row 42. The axial gap $\Delta_2$ between the second flange 34 and the rollers 4 in the second roller row 42 will not decrease to zero when there is an axial load acting on the bearing 1 during operation of the bearing in the second axial direction. An axial extension $L_{34}$ of the second flange 34 is extending such that there will be no contact with any roller elements 4 of the second roller row 42 during operation of the bearing 1 when there is an axial load acting on the inner ring 3 in the second axial direction. Thus, the bearing 1 as presented in this embodiment will be able to be subjected to large axial loads in both axial directions without any contact appearing between any of the flanges 33, 34 and its respective adjacent roller rows 41 and 42. Furthermore, the bearing 1 presents a cage 5 and a guide ring 51, wherein the guide ring 51 is located axially in-between the two roller rows 41 and 42.

Figure 2:
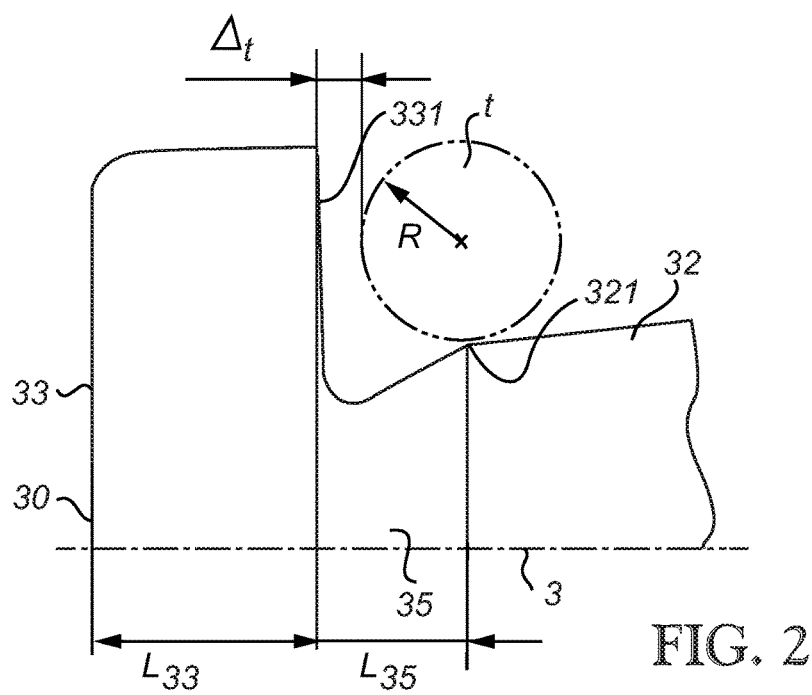
FIG. 2 is a detailed view of a an axial end of an inner ring of an embodiment of a double-row spherical roller bearing according to the present disclosure.
Figure 3:
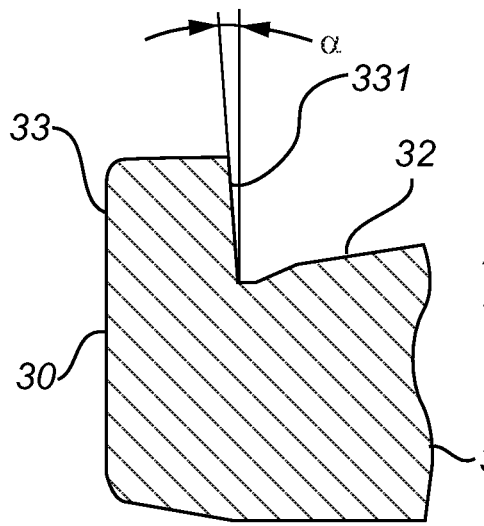
FIG. 3 is a detailed view of a cross section of an axial end of an inner ring of another embodiment of a double-row spherical roller bearing according to the present disclosure.

In FIG. 2, an enlarged view of an axial end 30 of an inner ring 3 according to an embodiment of the present disclosure can be seen. The inner ring 3 comprises on its first axial end 30 a first flange 33. Further, an outer raceway surface 32 can be seen. the inner ring 3 further presents a first circumferential intermediate surface 35 located on the outer peripheral surface and axially in-between the first flange 33 and the at least one outer raceway 32. The intermediate surface presents an axial extension $L_{35}$. The axial extension $L_{35}$ of the first intermediate surface 35 is extending such that a turning tool t for turning the at least one outer raceway 32 will not come in contact with the first flange 33 during a turning operation. As can be further seen in this embodiment, there is an axial gap $\Delta_t$ between the turning tool t and the first flange 33 when the turning tool has reached the axially outer surface of the raceway 32. In an embodiment, the axial gap $\Delta_t$ is essentially 2 mm. The turning tool t presents a radius R which in this embodiment is 4.76 mm. Moreover, the first flange 33 presents an inner axial side face 331. The side face 331 is angled out from the raceway surface 32 in the range of 0-3 degrees in relation to the radial direction of the bearing 1. In FIG. 3, the angle α of the inner axial side face 331 of the first flange can be seen, which in this specific embodiment is set to approximately 1 degree. The outer raceway 32 on the inner ring 3 is also seen in this enlarged view of the first axial end 30 of the inner ring 3. The configuration of the inner axial end face 331 and the intermediate surface 35 will facilitate the manufacturing of the inner ring 3, leading to a reduced cost in manufacturing.

Figure 4:
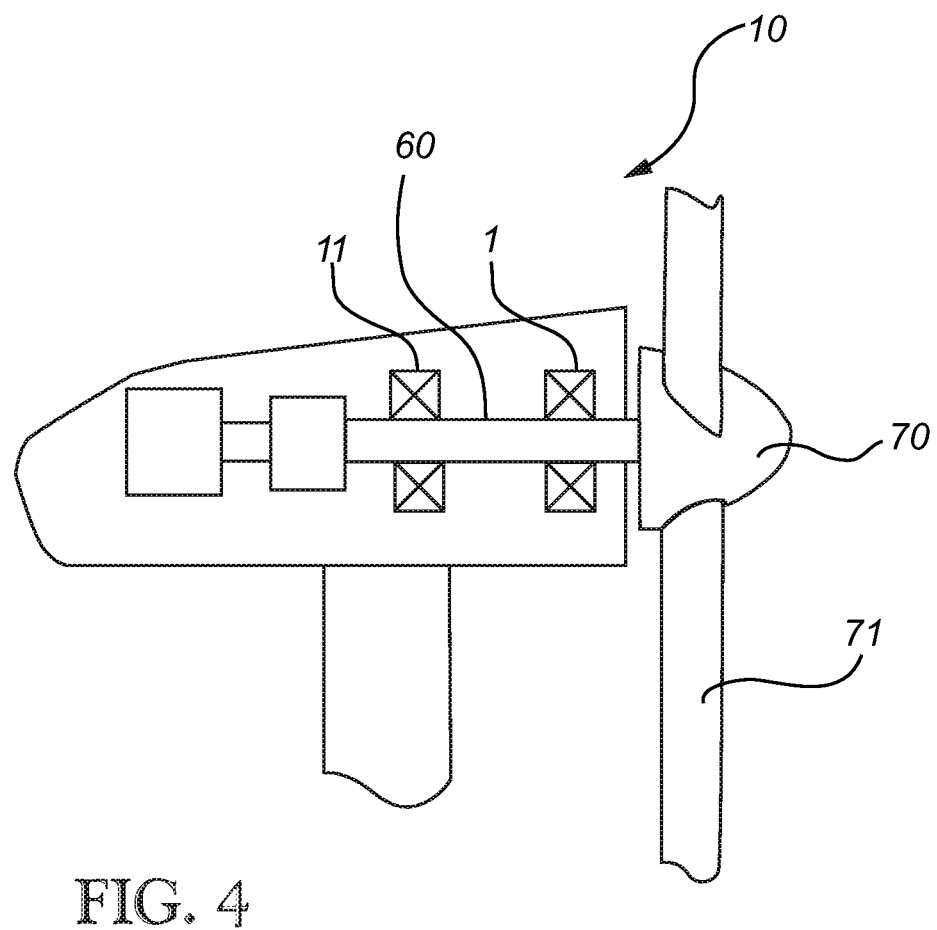
FIG. 4 illustrates a cross section of a wind turbine bearing arrangement according to an embodiment of the second aspect of the disclosure.

FIG. 4 shows an embodiment of the second aspect of the present disclosure. A wind turbine bearing arrangement 10 is disclosed, which comprises a rotor shaft 60 connected to a plurality of rotor blades 71 via a hub 70, wherein the rotor shaft 60 is rotatably supported by two rolling bearings 1 and 11, and wherein one of these two rolling bearings is a double-row spherical roller bearing 1 according to any of the embodiments of the first aspect of the disclosure. In addition, in this embodiment, the rotor shaft 60 is supported by a second bearing 11. This bearing 11 may be any kind of rolling bearing, such as for instance a toroidal roller bearing, a cylindrical roller bearing, a tapered roller bearing or another double-row spherical roller bearing. As earlier mentioned, the bearing 1 according to the first aspect of the disclosure is especially suitable in applications which are designed to accommodate large axial loads and also in slow-rotating applications. In an embodiment of the wind turbine 10, the rotor shaft 60 will rotate with a rotational speed of less than 50 routes per minute (rpm). By having a wind turbine 10 comprising a spherical roller bearing 1 according to the first aspect of the disclosure, the service life of the bearing arrangement may be increased. Also, as earlier mentioned, unwanted clicking noise may be reduced.

Figure 5:
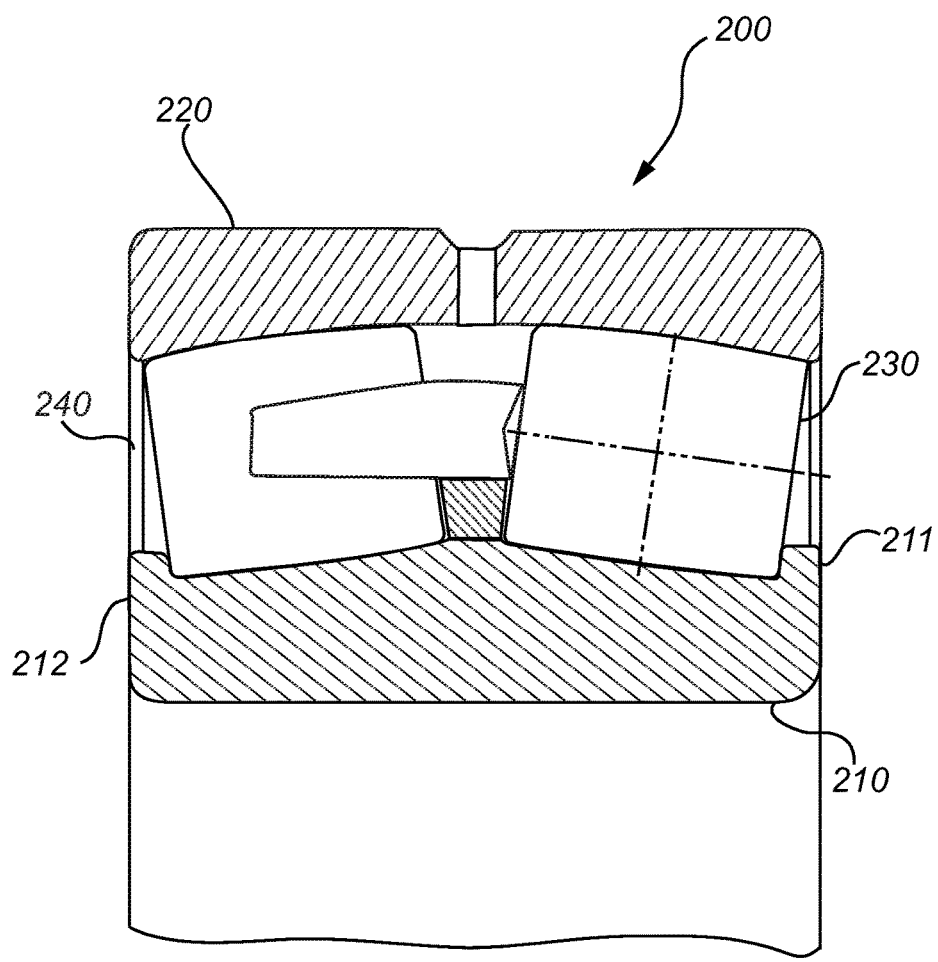
FIG. 5 illustrates a prior art spherical roller bearing in a cross sectional view.

FIG. 5 shows a prior art spherical roller bearing. The bearing 200 comprises an inner ring 210 and an outer ring 220. In-between the rings are two roller rows 230 and 240 located. In addition, two flanges 211 and 212 are located on axial end faces of the inner ring 210. As can be seen in the figure, there are no, or very small, axial gaps between the flanges 211 and 212 and the respective roller rows 230 and 240. Also, if the bearing is subjected to an axial force, and especially a relatively large axial force, the flange 211 or 212 would contact its respective roller row 230 and 240 which may lead to an unwanted noise and also this may reduce the bearing performance. This is prevented with the new flange and bearing design.

What is claimed is:

1. A double-row spherical roller bearing, comprising:
an outer ring presenting at least one spherical inner raceway on a radially inner peripheral surface;
an inner ring presenting a first axial end and a second axial end and at least one outer raceway on a radially outer peripheral surface;
spherical roller elements located in a first roller row and a second roller row interposed in-between the at least one inner raceway and the at least one outer raceway; and
a first flange located at the first axial end and extending in the circumferential direction of the outer peripheral surface, wherein a first axial gap Δ1 is located in-between the first flange and the adjacent first roller row,
wherein the inner ring is adapted to be subjected to an axial load in a first axial direction such that the first flange approaches the first roller row,
wherein, during operation of the bearing, the first axial gap Δ1 will not decrease to zero when the axial load is acting on the inner ring in the first axial direction.

2. The double-row spherical roller bearing according to claim 1, further comprising:
a second flange located at the second axial end and extending in the circumferential direction of the outer peripheral surface, wherein there is a second axial gap Δ2 located in-between the second flange and the adjacent second roller row.

3. The double-row spherical roller bearing according to claim 2,
wherein any of the first flange or the second flange presents an inner axial end face surface extending radially and in the circumferential direction,
wherein the inner axial end face surface is angled out from the at least one outer raceway in the range of 0-3 degrees in relation to the radial direction of the bearing.

4. The double-row spherical roller bearing according to claim 2, wherein the inner ring further includes:
a first circumferential intermediate surface located on the outer peripheral surface and axially in-between the first flange and the at least one outer raceway, and
a second circumferential intermediate surface located on the outer peripheral surface and axially in-between the second flange and the at least one outer raceway.

5. The double-row spherical roller bearing according to claim 4,
wherein an axial extension of the second intermediate surface is extending such that a turning tool for turning the at least one outer raceway will not come in contact with the second flange during a turning operation.

6. The double-row spherical roller bearing according to claim 4,
wherein an axial extension of any of the first or second intermediate surfaces is extending such that a turning tool for turning the at least one outer raceway will not come in contact with the first or second respective flange during a turning operation.

7. The double-row spherical roller bearing according to claim 6,
wherein any of the first intermediate surface or the second intermediate surface is further extended such that there is an axial gap between the turning tool and the first respective flange or the second respective flange when the turning tool has reached a respective first second axial end of the outer raceway or the second axial end of the outer raceway during the turning operation.

8. The double-row spherical roller bearing according to claim 7,
wherein the respective axial gap between the turning tool and any of the first flange or the second flange during the turning operation is in the range of 1-3 mm.

9. The double-row spherical roller bearing according to claim 7,
wherein the respective axial gap between the turning tool and any of the first flange or the second flange during the turning operation is 2 mm.

10. The double-row spherical roller bearing according to claim 2,
wherein the inner ring is adapted to be subjected to an axial load in a second axial direction such that the second flange approaches the second roller row,
wherein, during operation of the bearing, the second axial gap Δ2 will not decrease to zero when the axial load is acting on the inner ring in the second axial direction.

11. The double-row spherical roller bearing according to claim 10,
wherein the inner raceway and the outer raceway are designed to ensure that, during operation of the bearing, the second axial gap Δ2 will not decrease to zero when the axial load acting on the inner ring in the second axial direction corresponds to an equivalent load in a range of $4 \geq C/P \geq 1$,
wherein C is a basic dynamic load rating in Newtons and wherein P is an equivalent dynamic bearing load in Newtons.

12. The double-row spherical roller bearing according to claim 1,
wherein the inner raceway and the outer raceway are designed to ensure that, during operation of the bearing, the first axial gap Δ1 will not decrease to zero when the axial load acting on the inner ring in the first axial direction corresponds to an equivalent load in a range of $4 \geq C/P \geq 1$,
wherein C is a basic dynamic load rating in Newtons and wherein P is an equivalent dynamic bearing load in Newtons.

13. The double-row spherical roller bearing according to claim 1,
wherein the inner ring further includes a first circumferential intermediate surface located on the outer peripheral surface and axially in-between the first flange and the at least one outer raceway.

14. The double-row spherical roller bearing according to claim 13,
wherein an axial extension of the first intermediate surface is extending such that a turning tool for turning the at least one outer raceway will not come in contact with the first flange during a turning operation.

15. A wind turbine bearing arrangement, comprising,
a rotor shaft connected to a plurality of rotor blades via a hub,
at least one rolling bearing, wherein the at least one rolling bearing is a double-row spherical roller bearing comprising:
   an outer ring presenting at least one spherical inner raceway on a radially inner peripheral surface;
   an inner ring presenting a first axial end and a second axial end and at least one outer raceway on a radially outer peripheral surface;
   spherical roller elements located in a first roller row and a second roller row interposed in-between the at least one inner raceway and the at least one outer raceway; and
   a first flange located at the first axial end and extending in the circumferential direction of the outer peripheral surface, wherein a first axial gap $\Delta_1$ is located in-between the first flange and the adjacent first roller row,
wherein the inner ring is adapted to be subjected to an axial load in a first axial direction such that the first flange approaches the first roller row,
wherein, during operation of the bearing, the first axial gap $\Delta_1$ will not decrease to zero when the axial load is acting on the inner ring in the first axial direction,
wherein the rotor shaft is rotatably supported by the at least one rolling bearing.

* * * * *